United States Patent
Hsu et al.

(10) Patent No.: US 7,934,484 B2
(45) Date of Patent: May 3, 2011

(54) METHOD AND DEVICE FOR CONTROLLING AN INTERNAL COMBUSTION ENGINE WHEN CHANGING OPERATING MODES

(75) Inventors: Kia Hsu, Regensburg (DE); Markus Mantei, Friedersdorf (DE); Dirk Schneider, Pfaffenhofen (DE)

(73) Assignee: Continental Automotive GmbH, Hannover (DE)

( * ) Notice: Subject to any disclaimer, the term of this patent is extended or adjusted under 35 U.S.C. 154(b) by 310 days.

(21) Appl. No.: 12/088,351

(22) PCT Filed: Sep. 4, 2006

(86) PCT No.: PCT/EP2006/065962
§ 371 (c)(1),
(2), (4) Date: Nov. 17, 2008

(87) PCT Pub. No.: WO2007/039368
PCT Pub. Date: Apr. 12, 2007

(65) Prior Publication Data
US 2009/0101125 A1 Apr. 23, 2009

(30) Foreign Application Priority Data
Sep. 30, 2005 (DE) .................. 10 2005 046 952

(51) Int. Cl.
*F02B 3/10* (2006.01)
*F02B 3/00* (2006.01)
(52) U.S. Cl. ....................... 123/299; 123/681
(58) Field of Classification Search .............. 123/299, 123/295, 300, 305, 430, 681–684; 701/103, 701/104
See application file for complete search history.

(56) References Cited

U.S. PATENT DOCUMENTS

| 6,073,606 A | * | 6/2000 | Shimizu et al. ............ 123/295 |
| 6,470,869 B1 | | 10/2002 | Russell et al. ............. 123/681 |
| 7,467,617 B2 | * | 12/2008 | Irisawa ..................... 123/431 |

FOREIGN PATENT DOCUMENTS

| DE | 10051425 | 10/2000 |
| EP | 0890738 | 7/1998 |
| EP | 0937880 | 2/1999 |
| WO | 2004/055351 | 7/2004 |
| WO | 2006/013139 | 2/2006 |

OTHER PUBLICATIONS

Inernational Search Report and Written Opinion; PCT/EP2006/065962; pp. 12, Sep. 4, 2006.

* cited by examiner

*Primary Examiner* — Mahmoud Gimie
(74) *Attorney, Agent, or Firm* — King & Spalding L.L.P.

(57) ABSTRACT

In a method for controlling an internal combustion engine (10) during which two operating modes (OPMOD) are switched between under the permissible variation of at least one first and one second torque manipulated variables if, as a result, a torque-neutral changing over into the target operating mode (OPMOD_F) can be achieved within a cylinder segment. If the predetermined changing over condition is fulfilled, a torque-neutral changing over occurs while varying the at least first and second torque manipulated variables. If the predetermined changing over condition is not fulfilled, the initial operating mode (OPMOD_I) is maintained and at least one of the at least first and second torque manipulated variables and an at least one third torque manipulated variable are torque neutrally varied until the change over condition is fulfilled.

15 Claims, 6 Drawing Sheets

METHOD AND DEVICE FOR CONTROLLING AN INTERNAL COMBUSTION ENGINE WHEN CHANGING OPERATING MODES

CROSS-REFERENCE TO RELATED APPLICATIONS

This application is a U.S. national stage application of International Application No. PCT/EP2006/065962 filed Sep. 4, 2006, which designates the United States of America, and claims priority to German application number 10 2005 046 952.3 filed Sep. 30, 2005, the contents of which are hereby incorporated by reference in their entirety.

TECHNICAL FIELD

The invention relates to a method and a device for controlling an internal combustion engine. The invention also relates to a corresponding device for an internal combustion engine of said kind.

BACKGROUND

Internal combustion engines are expected to satisfy increasingly stringent requirements in terms of their performance and efficiency. At the same time emissions must also be kept low in order to comply with exacting statutory regulations. Requirements of this kind can be satisfactorily met if fuel is injected in a combustion chamber of the internal combustion engine in at least two operating modes and there is the possibility of switching between said operating modes. In addition to affecting the raw emissions of hydrocarbons and nitrogen oxides as well as the temperature profile of the exhaust gas, this switchover capability also has an impact on the irregular running of the internal combustion engine.

In internal combustion engines fuel can be injected into the combustion chamber of the internal combustion engine in, for example, a homogeneous mode of operation or in a stratified mode of operation.

In the homogeneous operating mode the fuel is injected into the combustion chamber of the internal combustion engine mainly during the induction phase, and consequently is still largely swirled until the fuel ignites, thus leading to a largely homogeneous fuel/air mixture. The homogeneous operating mode is preferably provided for the full-load mode of operation of the internal combustion engine.

In the stratified operating mode the fuel is introduced into the combustion chamber mainly during the compression phase. This results in a stratification of fuel in the combustion chamber at the time of ignition of the fuel. The stratified operating mode is mainly suitable for the no-load and partial-load modes of operation.

In addition to the homogeneous operating mode or the stratified operating mode there are also various intermediate forms between these two operating modes or the corresponding operating modes combined with a single injection or a multiple injection of fuel into the combustion chamber.

EP 1 199 469 A2 discloses a method for controlling an internal combustion engine, comprising fuel nozzles by means of which fuel can be injected directly into combustion chambers of the internal combustion engine. In a first step of the method for controlling the internal combustion engine the latter is initially operated in a homogeneous operating mode with single injection. The ignition angle is varied over a specific period of time in such a way that the torque decreases. At a predefined time the operating mode changes from the homogeneous operating mode with single injection to a stratified operating mode with multiple injection. During the switch from the homogeneous operating mode with single injection to the stratified operating mode with multiple injection the ignition angle is changed abruptly such that the transition from one operating mode to the other operating mode takes place in torque-neutral fashion. The control operation can also be performed in the reverse direction, i.e. such that in the stratified operating mode with multiple injection the ignition angle is initially varied while changing the torque until a point is reached at which a switch can be made from the stratified operating mode with multiple injection to the homogeneous operating mode with single injection. During the switch from the stratified operating mode with multiple injection to the homogeneous operating mode with single injection the ignition angle is changed abruptly such that no change in torque occurs.

SUMMARY

A method and a device for controlling an internal combustion engine can be created which enable efficient operation of the internal combustion engine.

According to an embodiment, a method for controlling an internal combustion engine having at least one cylinder in which there is embodied a combustion chamber into which fuel is injected in at least two operating modes, wherein a fast torque correcting path includes at least a first and a second current torque correcting variable and a slow torque correcting path includes at least a third current torque correcting variable, and a switchover between the operating modes is effected with permissible variation of at least the first and the second current torque correcting variable from an initial operating mode to a target operating mode if a predefined switchover condition is met, wherein the torque correcting variables act on final control elements of the internal combustion engine, the method may comprise the following steps: a) by means of the predefined switchover condition, performing a check to determine whether a torque-neutral switchover into the target operating mode can be achieved within one cylinder segment by means of a variation of the at least first and second current torque correcting variable that is permissible for the target operating mode if the predefined switchover condition is met, b) performing a torque-neutral switchover from the initial operating mode to the target operating mode while varying the at least first and second current torque correcting variables, and if the predefined switchover condition is not met, maintaining the initial operating mode and at least one of the at least first and second current torque correcting variables and varying the at least third current torque correcting variable in a torque-neutral manner until such time as the switchover condition is fulfilled.

According to a further embodiment, a torque characteristic value can be determined as a function of at least one of the first, second and third current torque correcting variables, and the switchover condition is dependent on the torque characteristic value. According to a further embodiment, the at least first and second current torque correcting variables can be selected from a group consisting of ignition angle setpoint value, mass fuel flow setpoint value and injection phasing setpoint value. According to a further embodiment, the at least third current torque correcting variable may be selected from a group consisting of mass fresh gas flow setpoint value, camshaft phasing setpoint value and fuel pressure setpoint value. According to a further embodiment, the operating modes can be selected from a group consisting of a first operating mode in which fuel is injected into the combustion chamber once within one cylinder segment, a second operating mode in which fuel is injected more than once into the combustion chamber within one cylinder segment, a third operating mode in which, prior to an ignition event in the combustion chamber, fuel is present spatially homogeneously distributed in the combustion chamber, and a fourth operating mode in which, prior to an ignition event in the combustion chamber, fuel is present in a predefined, spatially inhomogeneous fuel density distribution in the combustion chamber.

According to another embodiment, a device for controlling an internal combustion engine may comprise at least one cylinder in which there is embodied a combustion chamber into which fuel is injected in at least two operating modes, wherein a fast torque correcting path includes at least a first and a second current torque correcting variable and a slow torque correcting path includes at least a third current torque correcting variable, and a switchover between the operating modes is effected with permissible variation of at least the first and the second current torque correcting variable from an initial operating mode to a target operating mode if a predefined switchover condition is met, and correcting variables are determined which act on final control elements, wherein the device is operable a) to perform a check, by means of the predefined switchover condition, to determine whether a torque-neutral switchover into the target operating mode can be achieved within one cylinder segment by means of a variation of the at least first and second current torque correcting variable that is permissible for the target operating mode, and b) to perform a torque-neutral switchover, if the predefined switchover condition is met, from the initial operating mode to the target operating mode while varying the at least first and second current torque correcting variables, and if the predefined switchover condition is not met, to maintain the initial operating mode and to vary at least one of the at least first and second current torque correcting variables and the at least third current torque correcting variable in a torque-neutral manner until such time as the switchover condition is fulfilled.

BRIEF DESCRIPTION OF THE DRAWINGS

Exemplary embodiments of the invention are explained below with reference to the schematic drawings, in which.

Elements of identical construction or function are designated by the same reference signs.

DETAILED DESCRIPTION

According to various embodiments of a method and a corresponding device for controlling an internal combustion engine having at least one cylinder in which there is embodied a combustion chamber into which fuel is injected in at least two operating modes, a fast torque correcting path includes at least a first and a second current torque correcting variable and a slow torque correcting path includes at least a third current torque correcting variable. With permissible variation of at least the first and the second current torque correcting variable a switchover is made between the operating modes from an initial operating mode to a target operating mode if a predefined switchover condition is met. The torque correcting variables act on final control elements of the internal combustion engine.

In a first step of the method with the predefined switchover condition a check is made to determine whether a torque-neutral switchover into the target operating mode can be achieved within one cylinder segment by means of a permissible (for the target operating mode) variation of the at least first and second current torque correcting variable.

In a second step, if the predefined switchover condition is met, a switchover is made in a torque-neutral manner from the initial operating mode to the target operating mode while varying the at least first and second current torque correcting variable, and, if the predefined switchover condition is not met, the initial operating mode is maintained and at least one of the at least first and second current torque correcting variable and the at least third current torque correcting variable are varied in a torque-neutral manner until such time as the switchover condition is met.

In this connection the torque correcting path is characterized as fast if the time constant of its correcting variables is dependent only on the time constant of one cylinder segment, i.e. the time of a working cycle of the internal combustion engine divided by the number of cylinders. Typically the time constant of the fast torque correcting path is in the range of a few milliseconds.

The torque correcting path with its correcting variables is characterized as slow if the time constant of the correcting variables is in the order of magnitude of several 100 ms and is therefore greater than the time constant of one cylinder segment by a factor of 10 to more than 100.

In this way it becomes possible also to implement the operating mode switchover also in a torque-based manner. This may be particularly advantageous because controllers of internal combustion engines can be torque-based. It is thus possible to refer all control operations of the internal combustion engine to the torque.

According to a further embodiment, a torque characteristic value is determined as a function of at least one of the first, second and third current torque correcting variable, and the switchover condition is dependent on the torque characteristic value.

The torque characteristic value can assume a predefined value range for each operating mode. If the internal combustion engine is at an operating point of the initial operating mode whose torque characteristic value lies outside the target operating mode range permissible therefor, no switch can be made from the initial operating mode to the target operating mode. The predefined switchover condition is not met until, by variation of the at least first and second current torque correcting variable, the torque characteristic value in the initial operating mode reaches a value that lies within the permissible range of the torque characteristic value of the target operating mode, and a switch can be made from the initial operating mode to the target operating mode, while at the same time one of the current torque correcting variables is varied such that a switchover can be effected without changing the torque.

This may be particularly advantageous because in this way the operating mode switchover can take place as a function of a single torque characteristic value.

In a further embodiment of the method the at least first and second current torque correcting variable are selected from a group consisting of an ignition angle setpoint value, a mass fuel flow setpoint value and an injection phasing setpoint value.

This may be particularly advantageous because these torque correcting variables can be varied particularly quickly, with the result that a change in operating mode can be completed within one cylinder segment.

In a further embodiment of the method the at least third current torque correcting variable is selected from a group consisting of a mass fresh gas flow setpoint value, a camshaft phasing setpoint value and a fuel pressure setpoint value.

According to a further embodiment, the operating modes are selected from a group consisting of a first operating mode, in which fuel is injected once into the combustion chamber during one cylinder segment, a second operating mode, in which fuel is injected more than once into the combustion chamber during one cylinder segment, a third operating mode, in which prior to an ignition event in the combustion chamber fuel is present spatially homogeneously distributed in the combustion chamber, and a fourth operating mode, in which prior to an ignition event in the combustion chamber fuel is present in a predefined, spatially homogeneous fuel density distribution in the combustion chamber.

Accordingly the method for controlling an internal combustion engine can be applied in an advantageous manner to operating modes with a different torque characteristic value of the internal combustion engine. Thus, for example, a switch can be made from the first operating mode, in which fuel is injected once into the combustion chamber (single injection) during one cylinder segment, into the second operating mode, in which fuel is injected more than once into the combustion chamber (multiple injection) during one cylinder segment of the cylinder. If the first operating mode with single injection has a higher torque characteristic value than the second operating mode with multiple injection, an energetic difference caused by the difference in the torque characteristic values can arise during the switchover from the first operating mode into the second operating mode as additional thermal energy which can be used to heat up a catalytic converter, as may be necessary in particular following the starting of an internal combustion engine. Once the catalytic converter has been heated up, a switch can once again be made from the second operating mode having the lower torque characteristic value into the first operating mode having the higher torque characteristic value.

Figure 1:
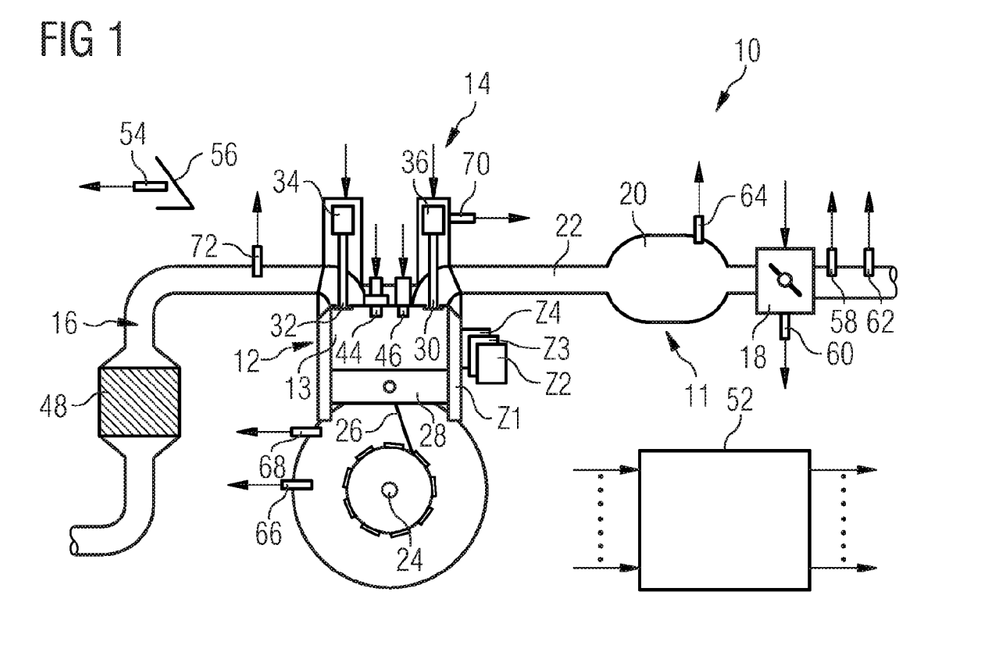
FIG. 1 shows an internal combustion engine having a control device.

An internal combustion engine 10 comprises an intake duct 11, an engine block 12, a cylinder head 14, and an exhaust duct 16. The intake duct 11 preferably comprises a throttle valve 18, a plenum chamber 20 and an intake manifold 22 which is ducted toward a cylinder Z1 via an inlet port into a combustion chamber 13 of the engine block 12. The engine block 12 further includes a crankshaft 24 which is coupled to a piston 28 of the cylinder Z1 via a connecting rod 26.

The cylinder head 14 comprises valve trains 34, 36 to which a gas inlet valve 30 and a gas outlet valve 32 are assigned, respectively. At least one charge motion valve (not shown) can also be provided to influence the fluidic flow into the combustion chamber 13 of the cylinder Z1.

The cylinder head 14 further includes an injection valve 44 and a spark plug 46.

An exhaust gas catalytic converter 48 which is preferably embodied as a three-way catalytic converter is disposed in the exhaust duct 16. Also provided is a control device 52 to which sensors are assigned which capture various measured variables and in each case determine the value of the measured variables. As a function of at least one of the measured variables, the control device 52 determines correcting variables which are then converted into one or more actuating signals for controlling the final control elements by means of corresponding actuating drives. The control device 52 can also be referred to as a device for controlling the internal combustion engine.

The sensors are a pedal position sensor 54 which detects an accelerator pedal position of an accelerator pedal 56, a mass air flow sensor 58 which detects a mass air flow upstream of the throttle valve 18, a first temperature sensor 62 which measures an intake air temperature, an intake manifold pressure sensor 64 which measures an intake manifold pressure in the plenum chamber 20, a crankshaft angle sensor 66 which measures a crankshaft angle to which a rotational speed is assigned, and a camshaft angle sensor 70 which measures the camshaft angle. Preferably also provided is a second temperature sensor 68 which measures a coolant temperature. Also provided is an exhaust gas probe 72 which is positioned upstream of the exhaust gas catalytic converter 48 and measures the residual oxygen content of the exhaust gas and whose measured signal is characteristic of the air/fuel ratio in the combustion chamber 13 of the cylinder Z1.

Depending on the embodiment, an arbitrary subset of the aforesaid sensors or also additional sensors may be present. Final control elements are for example the throttle valve 18, the gas inlet and gas outlet valves 30, 32, the charge motion valve, the injection valve 44 or the spark plug 46. As well as the cylinder Z1 the internal combustion engine also has further cylinders Z2, Z3, Z4 to which corresponding sensors and final control elements are assigned and which are controlled accordingly.

The control device 52 corresponds to a device for controlling the internal combustion engine.

Figure 2:
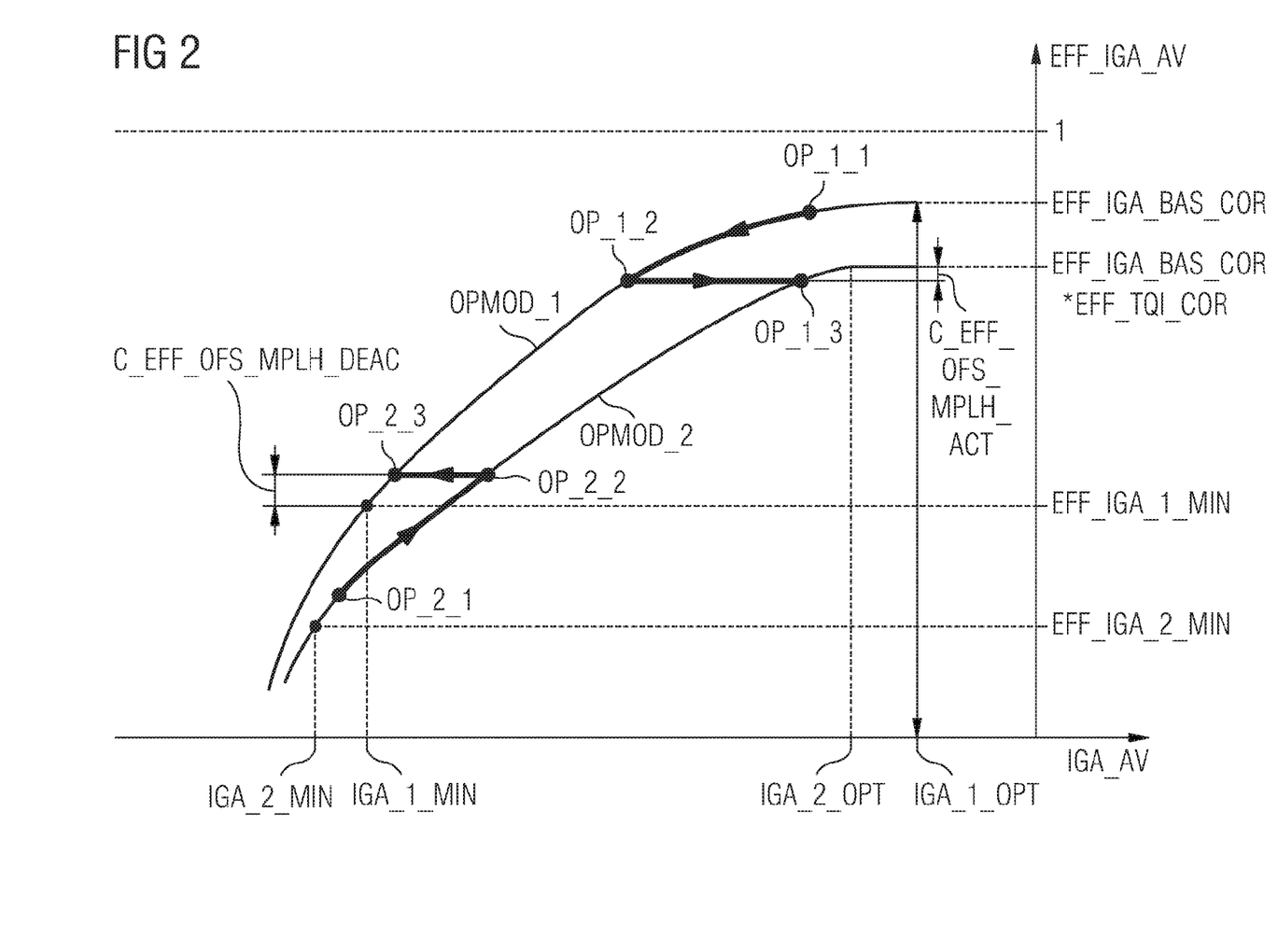
FIG. 2 is a diagram illustrating the method for controlling the internal combustion engine.

FIG. 2 shows a diagram with a torque characteristic value dependent on a first current torque correcting variable with the aid of an example in which a torque efficiency actual value EFF_IGA_AV is dependent on an ignition angle actual value IGA_AV.

The curve of the torque efficiency actual value of two operating modes, a first operating mode OPMOD_1 and a second operating mode OPMOD_2, is plotted.

The first operating mode OPMOD_1 can be for example an operating mode in which fuel is injected once into the combustion chamber 13 within one cylinder segment (single injection). The second operating mode OPMOD_2 can be an operating mode in which fuel is injected more than once into the combustion chamber 13 (multiple injection) within one cylinder segment. In this case single injection and multiple injection represent a second current torque correcting variable.

In one combination of operating modes, fuel can be present spatially homogeneously distributed in the combustion chamber (homogeneous operating mode) in one operating mode prior to an ignition event in the combustion chamber 13, whereas in the further operating mode fuel can be present in a predefined, spatially inhomogeneous fuel density distribution in the combustion chamber prior to an ignition event in the combustion chamber 13 (stratified operating mode).

In a further combination of operating modes fuel can be present spatially homogeneously distributed in the combustion chamber 13 in one operating mode prior to an ignition event, the ratio between fuel and air being stoichiometric. In the other operating mode fuel can likewise be present homogeneously distributed in the combustion chamber 13 prior to an ignition event in the combustion chamber 13, though in this case the ratio between air and fuel can be substoichiometric (lean).

The first and second operating modes OPMOD_1 and OPMOD_2 can, of course, also consist of combinations of the operating modes described in the foregoing.

In the example shown in FIG. 2 the method shall be described below with reference to a homogeneous operating mode with single injection for the first operating mode OPMOD_1 and to a homogeneous operating mode with multiple injection for the second operating mode OPMOD_2.

For the first operating mode OPMOD_1, a maximum torque efficiency EFF_IGA_BAS_COR of the first operating mode OP_MOD_1 results for an ignition angle IGA_1_OPT. Also predefined is a minimum possible ignition angle IGA_1_MIN of the first operating mode OPMOD_1, for which the torque efficiency EFF_IGA_1_MIN is at the minimum possible ignition angle IGA_1_MIN of the first operating mode OPMOD_1.

For the second operating mode OPMOD_2, the maximum possible torque efficiency for the ignition angle IGA_2_OPT is accordingly the product of the maximum torque efficiency EFF_IGA_BAS_COR of the first operating mode OPMOD_1 and a torque efficiency loss EFF_TQI_COR of the second operating mode OPMOD_2 compared to the first operating mode OPMOD_1. Also given is a torque efficiency EFF_IGA_2_MIN at the minimum possible ignition angle IGA_2_MIN of the second operating mode OPMOD_2.

Additionally predefined is a torque efficiency correction C_EFF_OFS_MPLH_ACT for the condition for switching from the first operating mode OPMOD_1 to the second operating mode OPMOD_2 and a torque efficiency correction C_EFF_OFS_MPLH_DEAC for the condition for switching from the second operating mode OPMOD_2 to the first operating mode OPMOD_1, the more precise meaning of which is explained below.

FIG. 2 also shows a first operating point OP_1_1, a second operating point OP_1_2 and a third operating point OP_1_3 of a first ignition curve and a first operating point OP_2_1, a second operating point OP_2_2_2 and a third operating point OP_2_3 of a second ignition curve (bold lines).

Figure 3:
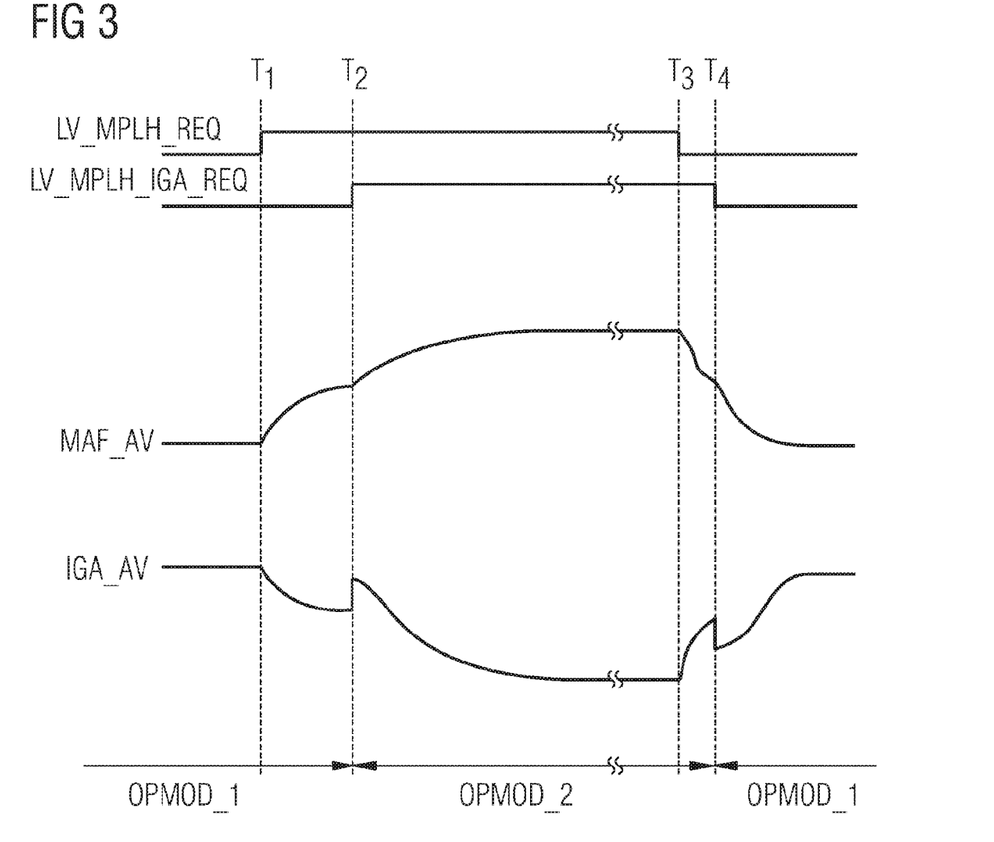
FIG. 3 shows the time characteristic of different operating variables during the execution of the method for controlling the internal combustion engine.

FIG. 3 shows the time characteristic of a switchover request LV_MPLH_REQ for multiple injection in homogeneous operating mode, an ignition angle change request LV_MPLH_IGA_REQ for multiple injection in homogeneous operating mode, the ignition angle actual value IGA_AV, and a mass fresh gas flow actual value MAF_AV during the execution of the method for controlling the internal combustion engine according to the procedure in FIG. 2.

Figure 4:
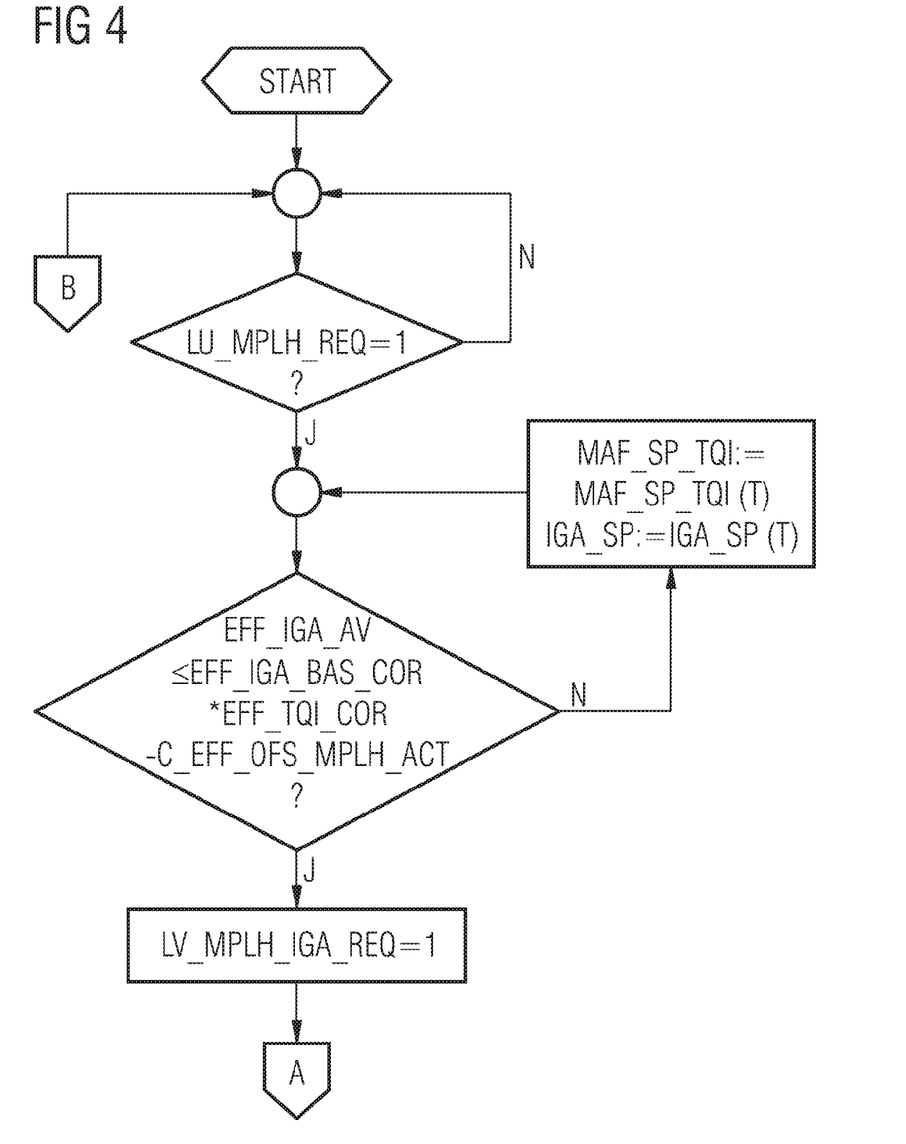
FIG. 4 is a flowchart of a program for controlling the internal combustion engine which is executed in the control device.
Figure 5:
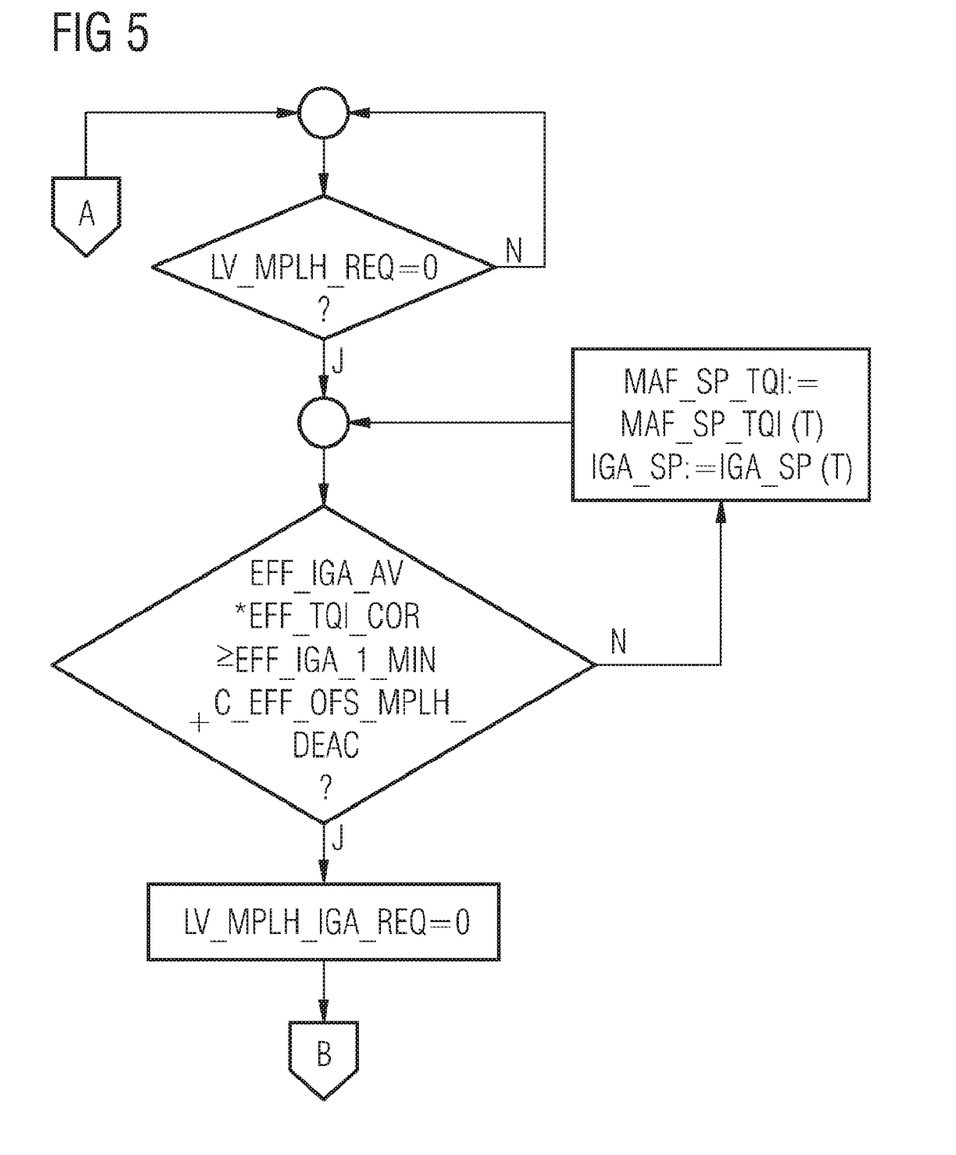
FIG. 5 is a further flowchart of the program for controlling an internal combustion engine which can be executed in the control device.

FIGS. 4 and 5 show the flowcharts of a program for controlling the internal combustion engine which is executed in the control device when the method for controlling the internal combustion engine according to FIG. 2 executes.

Figure 6:
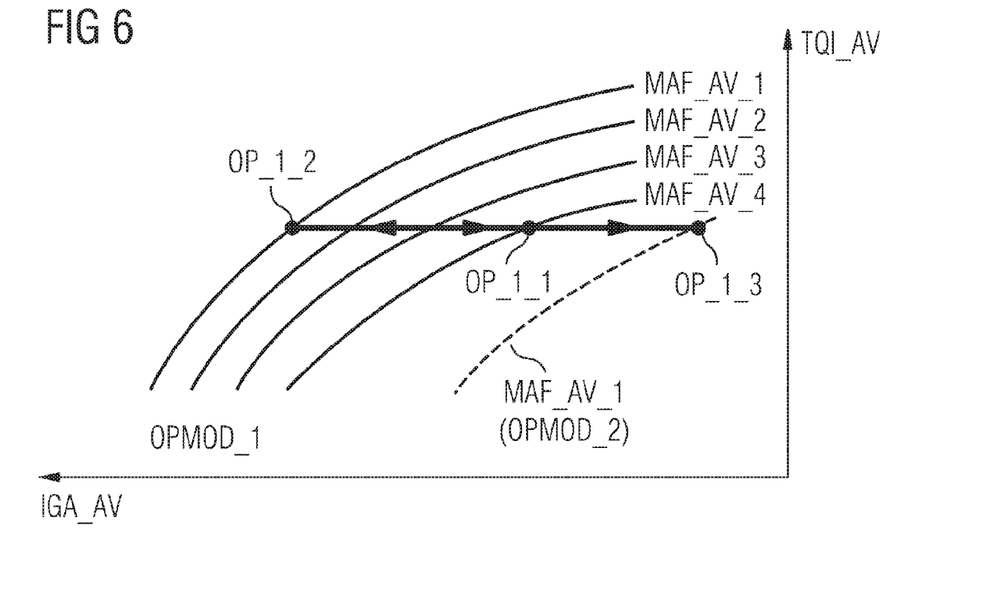
FIG. 6 is a further diagram illustrating the method for controlling the internal combustion engine.

FIG. 6 shows a diagram of the trend of a torque actual value TQI_AV as a function of the ignition angle actual value IGA_AV with the parameter mass fresh gas flow actual value MAF_AV. MAF_AV_1, MAF_AV_2, MAF_AV_3 and MAF_AV_4 are different fixed mass fresh gas flow actual values in the first operating mode OPMOD_1 and in the second operating mode OPMOD_2 (for mass fresh gas flow actual value MAF_AV_1 only), where the relationship MAF_AV_1>MAF_AV_2>MAF_AV_3>MAF_AV_4 applies. Also entered are the first operating point OP_1_1 at the mass fresh gas flow actual value MAF_AV_4, the second operating point OP_1_2 and the third operating point OP_1_3 at the mass fresh gas flow actual value MAF_AV_1, corresponding to the first ignition curve in FIG. 2.

The method shall be described below in particular with reference to FIGS. 2 to 6:

After the start (FIG. 4) of the program a check is first made to determine whether a switchover request LV_MPLH_REQ for multiple injections in homogeneous operating mode is present. While this is not the case (LV_MPLH_REQ=0), the query is repeatedly executed from the start, an integrated wait loop reducing the number of queries where appropriate. In the torque efficiency diagram (FIG. 2) and in the torque diagram (FIG. 6) the first operating point OP_1_1 of the first ignition curve, for example, is assumed in the first operating mode OPMOD_1. In this case the first operating mode OPMOD_1 represents an initial operating mode OPMOD_I.

If the switchover request LV_MPLH_REQ for multiple injections in homogeneous operating mode is equal to one (time T1 in FIG. 3), a check is made to determine whether the torque efficiency actual value EFF_IGA_AV as a function of the ignition angle actual value IGA_AV is less than or equal to the product from the maximum torque efficiency EFF_IGA_BAS_COR of the first operating mode OPMOD_1 and the torque efficiency loss EFF_TQI_COR of the second operating mode OPMOD_2 compared to the first operating mode of a homogeneous operating mode with single ignition less the torque efficiency correction C_EFF_OFS_MPLH_ACT for the condition for switching from the first operating mode OPMOD_1 to the second operating mode OPMOD_2. If this is not the case, a mass fresh gas flow setpoint value MAF_SP_TQI which forms a third current torque correcting variable is determined anew along with the ignition angle setpoint value IGA_SP corresponding to the current operating variables, in particular a torque setpoint value TQI_SP. While the aforementioned condition is not satisfied, the ignition angle setpoint value IGA_SP is reduced further, whereas the mass fresh gas flow setpoint value MAF_SP is increased. In FIG. 6 it can be seen that the operating point in the first operating mode OPMOD_1 with falling ignition angle actual value IGA_AV travels from the first operating point OP_1_1 with the lower mass fresh gas flow actual value MAF_AV_4 to the second operating point OP_1_2 with the higher mass fresh gas flow actual value MAF_AV_4. The transition from the first operating point OP_1_1 to the second operating point OP_1_2 takes place in a torque-neutral manner. In the torque efficiency diagram of FIG. 2 the operating point moves from the first operating point OP_1_1 of the first ignition curve to the second operating point OP_1_2 of the first ignition curve. FIG. 3 shows the resulting curve of the ignition angle actual value IGA_AV and the mass fresh gas flow actual value MAF_AV between the times T1 and T2.

As soon as the condition EFF_IGA_AV<EFF_IGA_BAS_COR*EFF_TQI_COR−C_EFF_OFS_MPLH_ACT is met (operating point OP_1_2 in FIG. 2), the ignition angle change request LV_MPLH_IGA_REQ for multiple injections in homogeneous operating mode is set to one (time T2 in FIG. 3). The ignition angle actual value IGA_AV is now abruptly increased, while at the same time a switch is made from the first operating mode OPMOD_1, the mode of operation with single injection, to the second operating mode OPMOD_2, the mode of operation with multiple injection. In this way a torque-neutral switchover can be made within one cylinder segment into the second operating mode OPMOD_2, which in this case is a final operating mode OPMOD_F. This can be seen particularly clearly in FIG. 6, whereas the ignition angle actual value IGA_AV rises the operating point jumps from the second operating point OP_1_2 in the first operating mode OPMOD_1 to the third operating point OP_1_3 in the second operating mode OPMOD_2 (in each case with the mass fresh gas flow actual value MAF_AV_1). The transition from the second operating point OP_1_2 to the third operating point OP_1_2 takes place in a torque-neutral manner. In FIG. 2 the operating point now jumps to the third operating point OP_1_3 of the first ignition curve. In the operating mode OPMOD_2 with lower torque efficiency, a catalytic converter can now be heated up, for example. In the flowchart according to FIG. 4 the transfer point A has now been reached.

Following the switchover operation, a torque efficiency setpoint value EFF_IGA_SP dependent on the ignition angle setpoint value IGA_SP can be reduced and the mass fresh gas flow setpoint value MAF_SP increased. These variables are varied in a torque-neutral manner. FIG. 3 shows the curve with falling ignition angle actual value IGA_AV and rising fresh gas flow actual value MAF_AV between the times T2 and T3 resulting therefrom for the illustrated example. In the example according to FIG. 2, the first operating point OP_2_1 of the second ignition curve, for example, can thus be reached, the second operating mode OPMOD_2 in this case representing the initial operating mode OPMOD_I.

A check is now made to determine whether the switchover request LV_MPLH_REQ for multiple injections in homogeneous operating mode is reset to zero (FIG. 5). While this is not the case, this query is executed repeatedly from the start, an integrated wait loop reducing the number of queries where appropriate.

After the end of the catalytic converter heating or another comparable request, the switchover request LV_MPLH_REQ for multiple injection in homogeneous operating mode is set to zero (FIG. 3 at time T3). A check is now made to determine whether the product of torque efficiency actual value EFF_IGA_AV as a function of the ignition angle actual value IGA_AV and torque efficiency loss EFF_TQI_COR of the second operating mode OPMOD_2 compared to the first operating mode OPMOD_1 is greater than or equal to the sum of the torque efficiency EFF_IGA_1 MIN at the minimum possible ignition angle of the first operating mode OPMOD_1 and the torque efficiency correction C_EFF_OFS_MPLH_DEAC for the condition for switching from the second operating mode OPMOD_2 to the first operating mode OPMOD_1 (FIG. 5). While this is not the case, the mass fresh gas flow setpoint value MAF_SP_TQI and the ignition angle setpoint value IGA_SP are varied in a torque-neutral manner until this condition is satisfied. On the torque efficiency characteristic curve of the second operating mode OPMOD_2 according to FIG. 2, the operating point moves from the first operating point OP_2_1 of the second ignition curve to the second operating point OP_2_2 of the second ignition curve. In the process the mass fresh gas flow actual value MAF_AV falls, while the ignition angle actual value IGA_AV rises, as can be seen in FIG. 3 (range between the times T3 and T4).

If the aforementioned condition is fulfilled, the ignition angle change request LV_MPLH_IGA_REQ for multiple injections in homogeneous operating mode is set to zero (time T4 in FIG. 3) and the ignition angle actual value IGA_AV is again reduced abruptly while a switchover from the multiple injection mode to the single injection mode takes place. Due to the change in the two torque correcting variables a torque-neutral switchover is achieved within one cylinder segment in the first operating mode OPMOD_1 (time T4 in FIG. 3) which in this case is the final operating mode OPMOD_F. In FIG. 5 the transfer point B has now been reached.

Following the switchover operation the torque efficiency setpoint value EFF_IGA_SP dependent on the ignition angle setpoint value IGA_SP can be increased and the mass fresh gas flow setpoint value MAF_SP reduced. These variables are varied in a torque-neutral manner. FIG. 3 shows the curve of the rising ignition angle actual value IGA_AV and the falling mass fresh gas flow actual value MAF_AV after the time T4 resulting therefrom for this example. In the example according to FIG. 2 the first operating point OP_1_1 of the first ignition curve can thus be reached again for example.

What is claimed is:

1. A method for controlling an internal combustion engine having at least one cylinder in which there is embodied a combustion chamber into which fuel is injected in at least two operating modes, wherein a switchover between the operating modes is effected from an initial operating mode to a target operating mode if a predefined switchover condition is met, the method comprising the following steps:
   a) by means of the predefined switchover condition, performing a check to determine whether a torque-neutral switchover from the initial operating mode to the target operating mode can be achieved within one cylinder segment by means of a variation of at least a first and a second current torque correcting variable that is permissible for the target operating mode, wherein the check includes comparing (a) a torque efficiency value corresponding to a particular value for the first current torque correcting variable with (b) the produce of a maximum torque efficiency value associated with the initial operating mode corrected and a correction factor corresponding to a difference in torque efficiency between the initial and target operating modes,
   b) if the predefined switchover condition is met, performing a torque-neutral switchover from the initial operating mode to the target operating mode while varying the at least first and second current torque correcting variables, and
   c) if the predefined switchover condition is not met, maintaining the initial operating mode and at least one of the at least first and second current torque correcting variables and varying at least a third current torque correcting variable in a torque-neutral manner until such time as the switchover condition is fulfilled.

2. The method according to claim 1, wherein a torque characteristic value is determined as a function of at least one of the first, second and third current torque correcting variables, and the switchover condition is dependent on the torque characteristic value.

3. The method according to claim 1, wherein the at least first and second current torque correcting variables are selected from a group consisting of ignition angle setpoint value, mass fuel flow setpoint value and injection phasing setpoint value.

4. The method according to claim 1, wherein the at least third current torque correcting variable is selected from a group consisting of mass fresh gas flow setpoint value, camshaft phasing setpoint value and fuel pressure setpoint value.

5. The method according to claim 1, wherein the operating modes are selected from a group consisting of a first operating mode in which fuel is injected into the combustion chamber once within one cylinder segment, a second operating mode in which fuel is injected more than once into the combustion chamber within one cylinder segment, a third operating mode in which, prior to an ignition event in the combustion chamber, fuel is present spatially homogeneously distributed in the combustion chamber, and a fourth operating mode in which, prior to an ignition event in the combustion chamber, fuel is present in a predefined, spatially inhomogeneous fuel density distribution in the combustion chamber.

6. A device for controlling an internal combustion engine comprising at least one cylinder in which there is embodied a combustion chamber into which fuel is injected in at least two operating modes, wherein a switchover between the operating modes is effected from an initial operating mode to a target operating mode if a predefined switchover condition is met, wherein the device is operable
   a) to perform a check, by means of the predefined switchover condition, to determine whether a torque-neutral switchover from the initial operating mode to the target operating mode can be achieved within one cylinder segment by means of a variation of the at least first and second current torque correcting variable that is permissible for the target operating mode, wherein the check includes comparing (a) a torque efficiency value corresponding to a particular value for the first current torque correcting variable with (b) the produce of a maximum torque efficiency value associated with the initial operating mode corrected and a correction factor corresponding to a difference in torque efficiency between the initial and target operating modes,
   b) to perform a torque-neutral switchover, if the predefined switchover condition is met, from the initial operating mode to the target operating mode while varying the at least first and second current torque correcting variables, and
   c) if the predefined switchover condition is not met, to maintain the initial operating mode and to vary at least one of the at least first and second current torque correcting variables and at least a third current torque correcting variable in a torque-neutral manner until such time as the switchover condition is fulfilled.

7. The device according to claim 6, wherein the device is operable to determine a torque characteristic value as a function of at least one of the first, second and third current torque correcting variables, and the switchover condition is dependent on the torque characteristic value.

8. The device according to claim 6, wherein the device is operable to select the at least first and second current torque correcting variables from a group consisting of ignition angle setpoint value, mass fuel flow setpoint value and injection phasing setpoint value.

9. The device according to claim 6, wherein the device is operable to select the at least third current torque correcting variable from a group consisting of mass fresh gas flow setpoint value, camshaft phasing setpoint value and fuel pressure setpoint value.

10. The device according to claim 6, wherein the device is operable to select the operating modes from a group consisting of a first operating mode in which fuel is injected into the combustion chamber once within one cylinder segment, a second operating mode in which fuel is injected more than once into the combustion chamber within one cylinder segment, a third operating mode in which, prior to an ignition event in the combustion chamber, fuel is present spatially homogeneously distributed in the combustion chamber, and a fourth operating mode in which, prior to an ignition event in the combustion chamber, fuel is present in a predefined, spatially inhomogeneous fuel density distribution in the combustion chamber.

11. A method for controlling an internal combustion engine having at least one cylinder and final control elements onto which torque correcting variables act on, the method comprising the steps of:
   injecting fuel into a combustion chamber in at least two operating modes,
   in the first operating mode by means of a predefined switchover condition, performing a check to determine whether a torque-neutral switchover into a target operating mode can be achieved within one cylinder segment by means of a variation of at least a first and second current torque correcting variable that is permissible for the target operating mode if the predefined switchover condition is met, wherein the check includes comparing (a) a torque efficiency value corresponding to a particular value for the first current torque correcting variable with (b) the produce of a maximum torque efficiency value associated with the initial operating mode corrected and a correction factor corresponding to a difference in torque efficiency between the initial and target operating modes, and
   in a second operating mode performing a torque-neutral switchover from an initial operating mode to the target operating mode while varying the at least first and second current torque correcting variables, and if the predefined switchover condition is not met, maintaining the initial operating mode and at least one of the at least first and second current torque correcting variables and varying at least a third current torque correcting variable in a torque-neutral manner until such time as the switchover condition is fulfilled.

12. The method according to claim 11, wherein a torque characteristic value is determined as a function of at least one of the first, second and third current torque correcting variables, and the switchover condition is dependent on the torque characteristic value.

13. The method according to claim 11, wherein the at least first and second current torque correcting variables are selected from a group consisting of ignition angle setpoint value, mass fuel flow setpoint value and injection phasing setpoint value.

14. The method according to claim 11, wherein the at least third current torque correcting variable is selected from a group consisting of mass fresh gas flow setpoint value, camshaft phasing setpoint value and fuel pressure setpoint value.

15. The method according to claim 11, wherein the operating modes are selected from a group consisting of a first operating mode in which fuel is injected into the combustion chamber once within one cylinder segment, a second operating mode in which fuel is injected more than once into the combustion chamber within one cylinder segment, a third operating mode in which, prior to an ignition event in the combustion chamber, fuel is present spatially homogeneously distributed in the combustion chamber, and a fourth operating mode in which, prior to an ignition event in the combustion chamber, fuel is present in a predefined, spatially inhomogeneous fuel density distribution in the combustion chamber.

* * * * *